United States Patent [19]
Marry et al.

[11] Patent Number: 5,630,210
[45] Date of Patent: May 13, 1997

[54] METHOD AND APPARATUS FOR DETERMINING SIGNAL TRANSMISSION QUALITY LEVELS OF A TRANSMITTED SIGNAL

[75] Inventors: Patrick J. Marry, Huntley; David C. Schuster, Buffalo Grove; Adam F. Gould, Palatine, all of Ill.

[73] Assignee: Motorola, Inc., Schaumburg, Ill.

[21] Appl. No.: 511,666

[22] Filed: Aug. 7, 1995

Related U.S. Application Data

[63] Continuation of Ser. No. 873,466, Apr. 24, 1992, abandoned.

[51] Int. Cl.$^6$ .................................................. H04B 17/00
[52] U.S. Cl. ................. 455/67.3; 455/67.7; 455/226.3; 455/226.4
[58] Field of Search .................... 455/31.1, 33.1, 455/38.4, 67.1, 67.3, 67.7, 134, 135, 226.2, 226.3, 226.4

[56] References Cited

U.S. PATENT DOCUMENTS

| | | | |
|---|---|---|---|
| 3,771,059 | 11/1973 | Butler et al. | 455/67.3 |
| 4,035,729 | 7/1977 | Perry | 455/226.3 |
| 4,068,176 | 1/1978 | McTaggart | 455/226.4 |
| 4,125,809 | 11/1978 | Mott | 455/226.4 |
| 4,393,499 | 7/1983 | Evans | 455/67.3 |
| 4,619,002 | 10/1986 | Thro | 455/33.1 |
| 4,710,969 | 12/1987 | Fluck, Jr. et al. | 455/67.7 |
| 4,766,600 | 8/1988 | Martin | 455/67.3 |
| 4,829,519 | 5/1989 | Scotten et al. | 455/67.3 |
| 4,890,332 | 12/1989 | Takahashi | 455/226.4 |
| 4,920,543 | 4/1990 | Martin | 455/67.7 |
| 4,953,197 | 8/1990 | Kaewell, Jr. et al. | 455/135 |
| 5,010,583 | 4/1991 | Parken | 455/135 |
| 5,025,208 | 6/1991 | Danzeisen | 455/67.3 |
| 5,050,234 | 9/1991 | Ohteru | 455/67.3 |
| 5,125,105 | 6/1992 | Kennedy et al. | 455/226.2 |
| 5,157,672 | 10/1992 | Kondou et al. | 455/134 |
| 5,203,008 | 4/1993 | Yasuda et al. | 455/33.1 |
| 5,203,027 | 4/1993 | Nounin et al. | 455/134 |

FOREIGN PATENT DOCUMENTS 8706748  11/1987  WIPO ................................. 455/67.7

*Primary Examiner*—Edward F. Urban
*Attorney, Agent, or Firm*—Daniel W. Juffernbruch

[57] ABSTRACT

An apparatus, and associated method, for determining signal transmission quality levels of a discretely-encoded information signal received by a receiver. The signal strength of the received signal is calculated, and the levels of interference introduced upon the information signal is determined. The value of the signal strength is weighted by the amount of interference introduced upon the information signal. The resultant weighted signal forms the signal transmission quality level. The value of the signal transmission quality level is displayed to provide a user with a quantitative indication of the signal transmission quality level of the signal received by the receiver.

17 Claims, 6 Drawing Sheets

METHOD AND APPARATUS FOR DETERMINING SIGNAL TRANSMISSION QUALITY LEVELS OF A TRANSMITTED SIGNAL

This is a continuation of application Ser. No. 07/873,466, filed Apr. 24, 1992 and now abandoned.

BACKGROUND OF THE INVENTION

The present invention relates generally to signal quality measuring apparatus, and, more particularly, to apparatus, and an associated method, for determining signal transmission quality levels of an information signal comprised of sequences of encoded data transmitted by a transmitter to a receiver.

A communication system is operative to transmit information between two or more locations, and includes, at a minimum, a transmitter and a receiver interconnected by a communication channel. A radio communication system is a communication system in which the transmission channel comprises a radio-frequency channel wherein the radio-frequency channel is defined by a range of frequencies of the communication spectrum.

The transmitter, which forms a portion of a radio communication system, includes circuitry for converting the information into a form suitable for transmission thereof upon a radio-frequency channel. Such circuitry includes modulation circuitry which performs a process referred to as modulation. In such a process, the information which is to be transmitted is impressed upon a radio-frequency electromagnetic wave.

The radio-frequency electromagnetic wave upon which the information is impressed is of a frequency within a range of frequencies defining in the radio-frequency channel upon which the information is to be transmitted. The radio-frequency, electromagnetic wave is commonly referred to as a "carrier signal," and the radio-frequency, electromagnetic wave, once modulated by the information signal, is referred to as a modulated signal. Such modulated signal is also sometimes referred to as an information signal, and the terms information signal and modulated signal will be used interchangeably hereinbelow to indicate the information once modulated upon the carrier.

Various modulation schemes are known for impressing the information signal upon the carrier signal to form thereby the information signal. For instance, amplitude modulation, frequency modulation, phase modulation, and combinations thereof are all modulation schemes by which information may be impressed upon a carrier wave to form an information signal.

Radio communication systems are advantageous in that no physical interconnection is required between the transmitter and the receiver; once the information is modulated to form an information signal, the information signal may be transmitted over large distances.

A two-way, radio communication system is a radio communication system, similar to the radio communication system described above, but which further permits both transmission of information to a location and transmission of information from that location. Each location of such a two-way, radio communication system contains both a transmitter and a receiver. The transmitter and receiver positioned at a single location typically comprise a unit referred to as a radio transceiver, or, more simply, a transceiver.

In some two-way, radio communication systems, the transceivers constructed to be operative therein are operative to transmit an information signal upon a first radio frequency channel and to receive an information signal transmitted upon a second, frequency channel. Because signals transmitted to and by such transceivers are transmitted upon different radio frequency channels, simultaneous two-way communication between two or more transceivers is permitted. Signals are continuously transmitted upon each of the two radio frequency channels to effectuate the two-way communication. Such two-way communication is oftentimes referred to generally by the term duplex operation of the transceiver.

Certain frequency bands of the electromagnetic frequency spectrum have been allocated for such two-way communication. For instance, a frequency band extending between 800 MHz and 900 MHz has been allocated in the United States for cellular communication systems. Other frequency bands have been similarly allocated in other countries. A plurality of radio frequency channels have been defined in such frequency band permitting operation of numerous cellular telephones (which constitute a type of transceiver construction) thereon.

In general, a cellular communication system is constructed by positioning a plurality of fixed-position transceivers, referred to as base stations, at spaced-apart locations throughout a geographical area. Such fixed-position base stations are physically connected to conventional telephonic networks. Other transceivers, typically referred to as radiotelephones, such as mobile, transportable, or portable radiotelephones, positioned within the geographic area defined by the positioning of the plurality of base stations, are operative to transmit and to receive modulated signals transmitted to and from a base station. An operator of a radiotelephone is thereby able to communicate with a fixed location of the conventional telephonic networks to which the base stations are physically connected.

The base stations comprising the cellular communication network transmit, at least periodically, data signals which are detectable by a radiotelephone. When a radiotelephone is first powered (i.e., turned on), the radiotelephone detects such data signals generated by a base station. Responsive to such data signals, transmitter and receiver circuitry of the radiotelephone is tuned to particular ones of the transmission channels allocated for the cellular communication system. Transmission and reception of voice, or other, communications then commences.

Radiotelephones operative in conventional cellular communication systems typically include apparatus for determining the signal strength of the signal received by the radiotelephone. An indication of the signal strength of signals transmitted to the radiotelephone by the base station provides an indication of the quality of the signal transmission therebetween.

In a conventional, cellular communication system, the signal strength of a received signal is the only quantitative indication of the transmission quality of the received signal.

A qualitative indication of the interference introduced upon a signal during transmission thereof to a receiver, which is also related to the quality of the signal transmission, is provided to a user of the radiotelephone as the interference distorts the signal, and such distortion affects the audible quality of the resultant signal heard by the user.

Conventionally, transceivers operative in cellular, communication systems generate modulated signals by a frequency modulation technique.

Increased popularity of use of such cellular communication systems has resulted in increased demand for access to the limited frequency bands, and, hence, limited number of radio frequency channels allocated for such systems. Schemes have been developed to utilize more efficiently the frequency bands allocated for such use.

Several of such schemes involve the modulating of the information into encoded form. In such a process, the information becomes compacted, and the information signal containing such information may be transmitted more efficiently (i.e., the same amount of information may be transmitted in a lesser amount of time). Additionally, an information signal formed by such a process need not be transmitted continuously; rather, the information signal may be transmitted in discrete bursts. One such scheme by which an information may be encoded is a π/4 shifted quaternary phase shift keying (π/4-QPSK) modulation scheme.

Various cellular communication systems have been proposed and are in various stages of implementation in which the information is encoded to permit transmission (and also reception) of an information signal formed by such a modulation scheme. For instance, in the United States, such a system has been proposed, referred to as the United States Digital Cellular (USDC) System. Also, in several other countries, and as will be described with respect to the description of the preferred embodiments hereinbelow, a somewhat similar system has also been proposed, referred to as the Group Special Mobile (GSM) System. Radiotelephones operative in such systems are similarly being developed.

In any communication system in which discretely-encoded information signals are transmitted, such as the above-noted USDC and GSM systems, the receiver which receives such signals must decode the information signal. During such decoding process, performed by decoding circuitry, interference introduced upon the signal during transmission to the radiotelephone is removed. As a result, an operator of the radiotelephone detects no audible indication of the amount of interference introduced upon the signal transmitted to the radiotelephone.

However, when the level of interference introduced upon the signal during the transmission thereof is so significant as to interfere with operation of the decoding circuitry of the radiotelephone, the operator of the radiotelephone is supplied with no signal during times in which the level of interference is so great as to prevent suitable operation of such decoding circuitry.

In contrast to a radiotelephone operative in a conventional, cellular communication system, an operator of a radiotelephone operative to transmit and to receive encoded information signals receives little or no warning of excessive levels of interference introduced upon an information signal transmitted to the radiotelephone until the radiotelephone is completely unable to decode the signal received by the radiotelephone.

While an operator of a radiotelephone operative in a conventional, cellular communication system can rely merely upon an indication of the received signal strength and a qualitative evaluation of the quality of the audible signals generated by the radiotelephone to make a judgement as to the suitability of communication by way of the radiotelephone at any particular location, an operator of a radiotelephone operative to transmit and to receive discretely-encoded information signals cannot make a similar judgement.

What is needed, therefore, is apparatus for determining a signal transmission quality level of a signal comprised of sequences of discretely encoded data transmitted to the receiver wherein the signal transmission quality level is indicative of not only the received signal strengths, but also the level of interference introduced upon the signal.

SUMMARY OF THE INVENTION

The present invention, accordingly, advantageously provides apparatus, and an associated method, for determining signal transmission quality levels of an information signal transmitted to a receiver.

The present invention further advantageously provides a radio receiver, such as a receiver portion of a radio transceiver, which determines signal transmission quality level values indicative of the signal level magnitudes of a signal transmitted to the receiver as well as the levels of interference introduced upon such signal.

The present invention provides further advantages and features, the details of which will become more apparent by reading the detailed description of the preferred embodiments hereinbelow.

In accordance with the present invention, therefore, an apparatus, and associated method, for determining signal transmission quality levels of an information signal comprised of sequences of encoded data transmitted between a transmitter and a receiver is disclosed. Signal level magnitudes of the signal transmitted between the transmitter and the receiver are calculated to form a received-signal strength value thereby. Levels of interference introduced upon the information signal transmitted between the transmitter and the receiver are determined to form an interference level value thereby. The received-signal strength value is weighted by the interference level value to form thereby a signal transmission quality level value representative of quality levels of the signal transmission between the transmitter and the receiver.

BRIEF DESCRIPTION OF THE DRAWINGS

The present invention will be better understood when read in light of the accompanying drawings in which.

DESCRIPTION OF THE PREFERRED EMBODIMENTS

Figure 1:
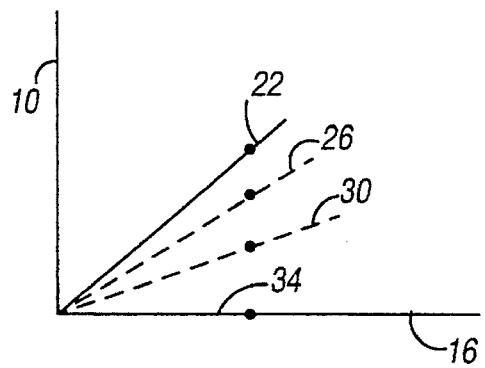
FIG. 1 is a graphical representation illustrating the relationship between the signal quality level of a signal received by a receiver and the signal strength thereof.

Referring first to the graphical representation of FIG. 1, the relationship between signal strength and signal quality of a signal received by a receiver, as conventionally quantified, is shown. Ordinate axis 10 is scaled in terms of a unitless quantity of signal quality, and abscissa axis 16 is scaled in terms of signal strength.

Curve 22 is a plot of the signal quality formed as a function solely of signal strength. As illustrated, the signal quality quantified in this manner is directly proportional to signal strength.

However, and as noted hereinabove, the signal quality of a signal received by a receiver is actually also dependent upon the amount of interference introduced upon the signal during transmission to the receiver. Curves 26, 30, and 34, shown in hatch, represent signal quality levels of a received signal when such interference is taken into account. Curve 34, shown coincident with axis 16, is representative of a signal having such a level of interference introduced thereupon that no information can be obtained from the signal received by the receiver.

A qualitative determination can be made of the amount of interference introduced upon a signal transmitted in a conventional, cellular communication system as a result of audible indications of such distortion. However, in a cellular communication system operative to communicate by way of discretely-encoded signals (or any other communication system in which discretely-encoded information signals are utilized), such interference is removed by decoding circuitry forming a portion of receiver circuitry of a radiotelephone operative in such systems. As a result, an operator of such a radiotelephone is provided with no indication of the levels of interference introduced upon such signals.

Because such interference does affect the signal quality of the signal received by receiver circuitry, providing the operator of the radiotelephone with an indication of the signal strength of the signal received by the radiotelephone such as the signal strength indication apparatus which forms a portion of many conventional radiotelephones, is inadequate to forewarn the operator of the radiotelephone of any problems with unduly excessive amounts of interference.

The preferred embodiment of the present invention, accordingly, calculates a value representative of a combination of the signal strengths of the signal received by such a receiver and the levels of interference introduced upon such signal to provide a composite, quantitative value representative of the signal quality level of the signal transmitted to the receiver.

Figure 2:
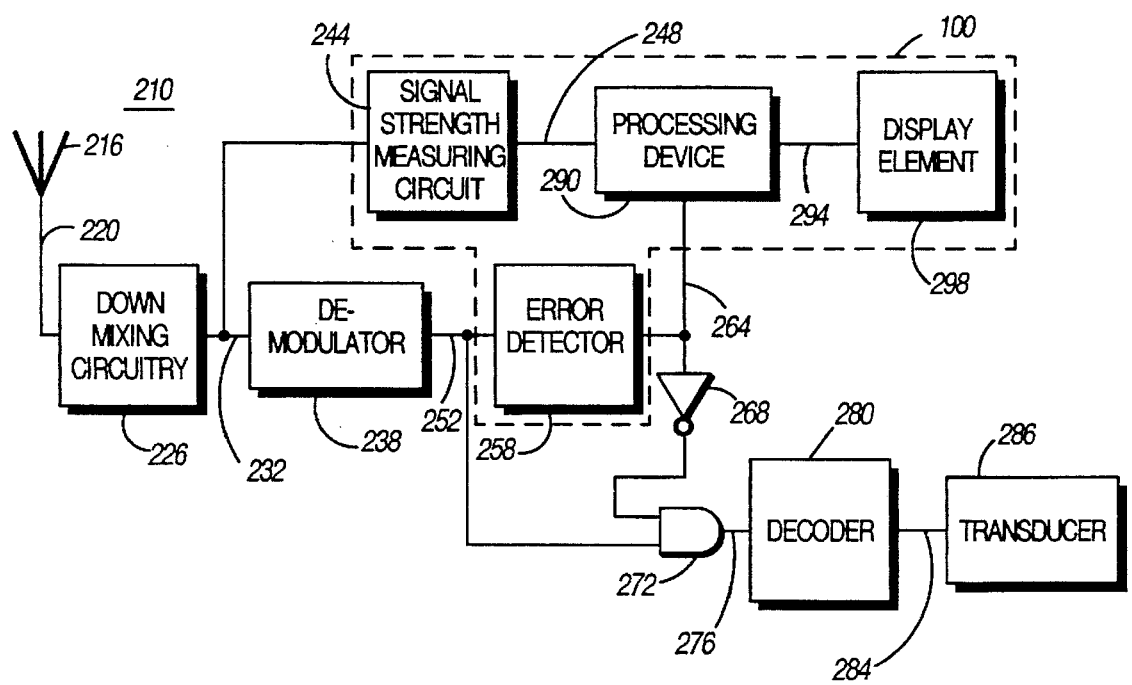
FIG. 2 is a block diagram of the apparatus of a preferred embodiment of the present invention for determining signal transmission quality level values of a signal transmitted to a receiver connected to form a portion of a radio receiver.

Turning now to the block diagram of FIG. 2, the apparatus, referred to generally by reference numeral 100 and which comprises the elements encompassed by the block shown in hatch, for determining signal transmission quality level values of a signal transmitted to a receiver is shown. Apparatus 100, as illustrated in FIG. 2, forms a portion of a radio receiver, referred to generally by reference numeral 210. Radio receiver 210 may, for example, comprise the receiver circuitry portion of a radio transceiver, such as a radiotelephone.

A discretely-encoded signal transmitted to radio receiver 210 is detected by antenna 216 which generates a signal representative of the detected signal on line 220. Line 220 is coupled to down mixing circuitry 226 which down-converts in frequency the signal supplied thereto on line 220, and which generates a down-converted signal on line 232.

The signal generated by down mixing circuitry 226 on line 232 is similar to the signal supplied to circuitry 226 on 220, but down-converted in frequency. As the signal supplied to circuitry 226 on line 220 is representative of the discretely-encoded, information signal transmitted by a transmitter to receiver 210, the signal generated on line 232 is similarly representative of the discretely-encoded information signal transmitted to receiver 210.

Line 232 is coupled to demodulator 238 and also to signal strength measuring circuit 244. Signal strength measuring circuit 244 is operative to measure the signal strength (i.e., the magnitude or amplitude) of the signal generated on line 232. As the signal generated on line 232 is representative of the signal detected by antenna 216, the signal strength of the signal generated on line 232 is similarly representative of the signal strength of the signal detected by the antenna.

Signal strength measuring circuit 244 generates a signal on line 248 responsive to such measurement. It is to be noted, of course, that signal strength measuring circuit 244 may be positioned to measure signals generated by other elements of radio receiver 210 similarly to provide an indication of the signal strength of the signal received by the receiver.

Demodulator 238 is operative to demodulate the down-converted signals supplied thereto on line 232, and to generate a demodulated signal on line 252.

Line 252 is coupled to error detector 258 to supply the demodulated signal generated on line 252 to the error detector. Error detector 258 is operative to detect errors introduced upon the discretely-encoded, information signal transmitted to radio receiver 210. Error detector 258 may, for instance, comprise circuitry similar to that disclosed in U.S. Pat. No. 5,113,400, and entitled "Error Detection System."

Error detector 258 generates a signal on line 264 during times in which error detector 258 detects an error in the signal received by receiver 210. As the discretely-encoded information signal transmitted to receiver 210 is comprised of sequences of bits of data, error detector 258 is operative to generate a signal on line 264 indicative of times when error detector 258 detects the presence of an erroneous bit or bits of the sequences of bits of the information signal transmitted to the receiver 210.

Line 264 is coupled by way of inverter 268 to an input of gate 272. Gate 272 is further coupled, at an input thereof, to line 252, thereby to receive the demodulated signal generated by demodulator 238 thereon. Gate 272 is operative to supply the demodulated signal supplied thereto on line 276 during times in which error detector 258 does not detect the presence of an erroneous bit. Conversely, when error detector 258 generates a signal on line 264 indicating the presence of an erroneous bit, no signal is generated on line 276.

Line 276 is coupled to decoder 280 which decodes the demodulated signal supplied thereto on line 276, and generates a decoded signal on line 284. Line 284 is coupled to transducer 286 which converts the decoded signal supplied thereto into an audible signal.

As illustrated, apparatus 100 of the preferred embodiment of the present invention includes signal strength measuring device 244 and error detector 258. While the actual construction of signal strength measuring device 244 and error detector 258 may vary, of significance are the signals generated by the respective elements on lines 248 and 264, respectively. The signal generated on line 248 is indicative of the signal strength of the signal received by receiver 210. And, the signal generated on line 264 is indicative of the error rate of the bits of the discretely-encoded information signal received by the receiver. Such a value is representative of the amount of interference introduced upon the signal transmitted to the receiver.

Lines 248 and 264 are coupled to processing device 290 which, in the preferred embodiment, is comprised of a microprocessor. Other types of processing devices may, of course, be alternately utilized. Processing device 290 is operative to combine the signals supplied thereto on lines 248 and 264 to provide thereby an indication of the signal transmission quality level of the signal transmitted to the receiver. As the signal transmission quality formed thereby is dependent not only upon the strength of the signal received by the receiver, but is additionally dependent upon an indication of the amount of interference introduced upon the signal received by the receiver, the signal quality level formed thereby more accurately provides a true indication of the actual signal transmission quality level of the signal received by the receiver. In the preferred embodiment, processing device 290 is operative to weight the value of the signal generated on line 248 (which is representative of the signal strength) by the value of the signal generated on line 264 (which is representative of the bit error rate which is, in turn, representative of the level of interference introduced upon the signal transmitted to receiver 210).

Processing device 290 generates a signal on line 294 which is representative of the signal transmission quality level of the signal received by the receiver 210. Line 294 is coupled to display element 298 which displays the signal transmission quality level represented by the signal generated on line 294 in appropriate fashion.

In the preferred embodiment, processing device 290 counts the number of times in which the signal generated on line 264 indicates an erroneous bit, and responsive to such summed value, the level of the signal generated on line 248 is altered.

Figure 3:
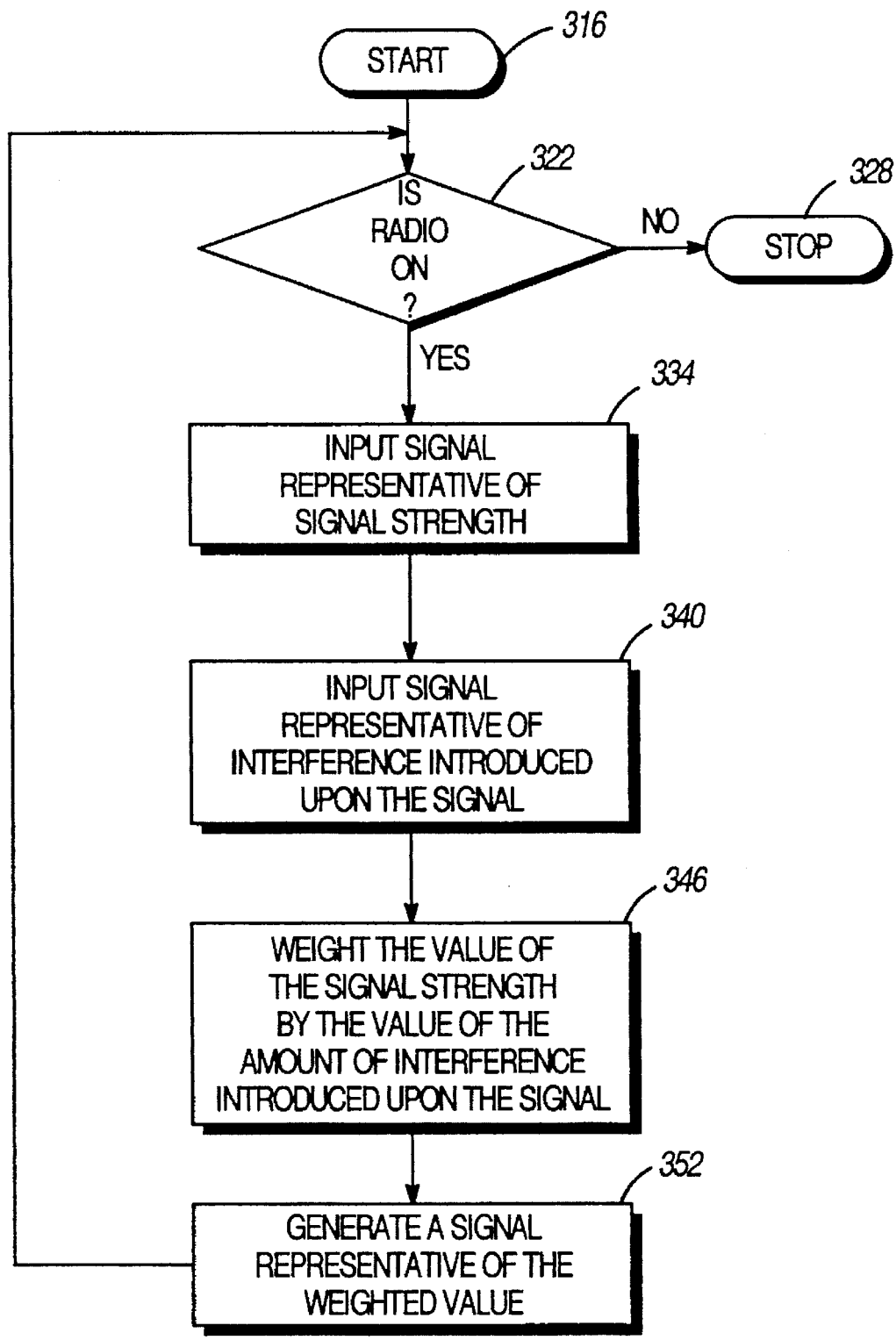
FIG. 3 is logical flow diagram of an algorithm embodied within a processing device which forms a portion of the apparatus of the preferred embodiment of the present invention shown in block form in FIG. 2.

Turning next to the logical flow diagram of FIG. 3, an algorithm, referred to generally by reference numeral 310, which may be embodied by processing device 290 to form the signal transmission quality level, is shown.

After entry into the algorithm, indicated by start block 316, a decision is made, as indicated by decision block 322, as to whether receiver 210 is powered on to be operative thereby. If receiver 210 is not powered on to be operative to receive a signal transmitted thereto, the no branch is taken from the decision block to exit, as indicated by stop block 328. If, conversely, the receiver is operative to receive a signal, the yes branch is taken to block 334 whereat the signal representative of the measured signal strength is input to the processor.

Next, and as indicated by block 340, a signal representative of the interference introduced upon the signal received by the receiver (as indicated by the bit error rate) is input to the processor. Next, and as indicated by block 346, the value of the signal strength is weighted by the value representative of the amount of interference introduced upon the signal received by the receiver. Finally, a signal is generated, as indicated by block 352 representative of such weighted value.

Such algorithm is repeated for so long as the receiver is operative to receive a signal to provide thereby a continuous indication of the signal transmission quality level of the signal received by the receiver.

The method and apparatus for determining signal transmission quality levels of a signal transmitted to a receiver may be advantageously utilized in any communication system in which discretely-encoded, information signals are transmitted. As mentioned previously, the GSM-cellular, communication system to be implemented in several European countries is to form a communication system operative to transmit and to receive discretely-encoded information signals. Apparatus for determining signal transmission quality level, similar to that of apparatus 100 of FIG. 2 may be advantageously utilized in such system to provide an operator of a cellular radiotelephone therein a quantitative indication of such signal transmission quality level. While the following exemplary example pertains specifically to the GSM-cellular, communication system, it is to be understood, of course, that apparatus 100 may similarly be utilized in other communication schemes.

The specification for the GSM-cellular, communication system define two parameters which may be advantageously utilized in the preferred embodiment of the present invention. A first value, called the "Receive Level," also referred to by the acronym RXLEV, is a quantitative value indicative of the signal strength of a signal received by receiver circuitry of cellular radiotelephones operative in a GSM-cellular, communication system.

The RXLEV value is scaled to be of values extending between zero and sixty-three wherein strong signal values (i.e., signals of high magnitudes or amplitudes) have high RXLEV values, and weak signal values (i.e., signals of low magnitude or amplitude) have low RXLEV values.

A second value, called the "Receive Quality," also referred to by the acronym RXQUAL, is a quantitative value indicative of the amount of interference introduced upon a signal received by receiver circuitry of the transceiver, again, such as the cellular radiotelephones operative in the GSM-cellular, communication system. The RXQUAL value is scaled to be of value extending between zero and seven wherein signals having large amounts of interference introduced thereupon have high RXQUAL values, and signals having little interference introduced thereupon have low RXQUAL values.

By combining the RXLEV and RXQUAL values to form a composite value thereby, and, more particularly, by weighting the RXLEV value with the RXQUAL value, to form a signal transmission quality level value, a user of a cellular radiotelephone may be provided with a quantitative indication of the actual signal quality of a signal received by the radiotelephone.

Responsive to such signal transmission quality level value, a user of the cellular radiotelephone may chose to delay placing a call with the radiotelephone until the radiotelephone may be placed in a position facilitating a better-quality call.

Accordingly, a signal transmission quality level value may be calculated by processing circuitry, such as processing device 290 of apparatus 100 of FIG. 2, according to the following equation:

$$SQI = RXLEV * (1 - (RXQUAL/A)) * B$$

where:

SQI is the value of the signal transmission quality level;

RXLEV is the Receive Level, as above defined;

RXQUAL is the Receive Quality level as above defined;

A is a first scale factor; and

B is a second scale factor.

First scale factor A is preferably of a value of seven. When first scale factor A is of a value of seven, and the RXQUAL value is also of a value of seven (RXQUAL is of a value of seven when large amounts of interference are introduced upon the signal received by the receiver) the signal transmission quality level value, SQI, is of a value of zero irrespective of the magnitude of RXLEV. In such manner, even when the signal strength of the signal received by the receiver is quite large, if the level of interference introduced upon such signal is significant, the signal quality transmission level value will be of a value of zero.

Second scale factor B is preferably determined responsive to the constraints of the display element, such as display element 298 of apparatus 100 of FIG. 2, at which the signal transmission quality level value is displayed. In the preferred embodiment, scale factor B is of a value of 0.5. The processing device which is operative to calculate the SQI value may truncate or otherwise modify the calculated value of SQI to ensure that the SQI value is an integer value.

Figure 4:
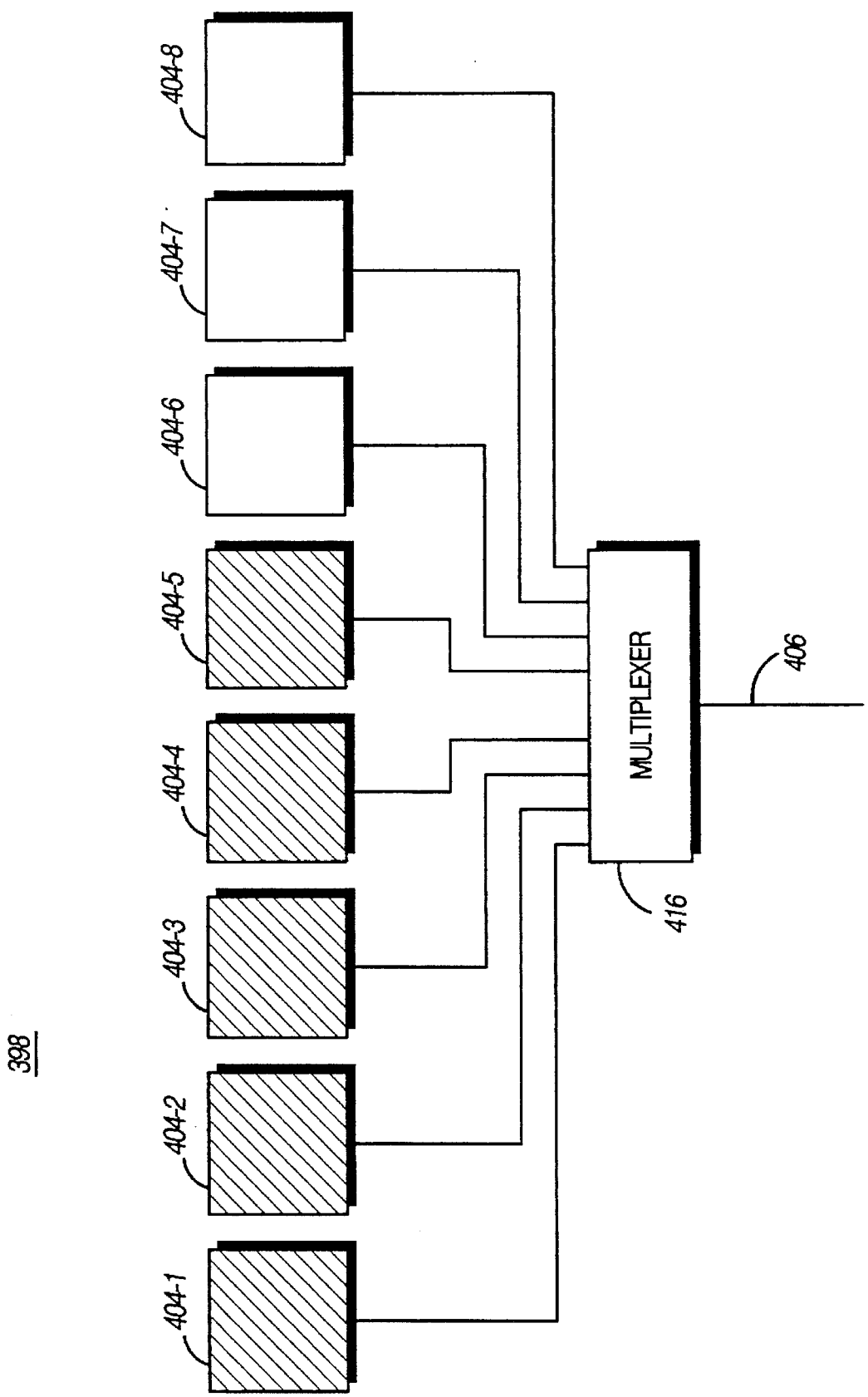
FIG. 4 is a block diagram of a display element which forms a portion of the apparatus of the preferred embodiment of the present invention for indicating the signal transmission quality levels of an information signal transmitted to a receiver shown in the block diagram of FIG. 2.

Turning next to the block diagram of FIG. 4, a display element, here referred to generally by reference numeral 398, similar to display element 298 shown in the block diagram of FIG. 2, is shown. Display element 398 here comprises a liquid crystal display, having portions indicated by blocks 404-I, 404-II, 404-III, . . . , 404-VIII. The signal transmission quality level value is supplied to display element 398 by way of line 406, and the value of the signal generated thereon determines which portions of display elements 398 (here indicated by blocks 401-I through 404-VIII) turn on.

As illustrated, line 406 is coupled to multiplexer 416. Outputs of multiplexer 416 are coupled to portions 404-I through 404-VIII of the liquid crystal display to cause various portions of the liquid crystal display to turn on responsive to the value of the signal representative of the signal transmission quality level value supplied on line 404. Shading of blocks 404-I through 404-V indicate powering of five LCD portions when the signal transmission quality level, SQI, is of a value of five.

Figure 5:
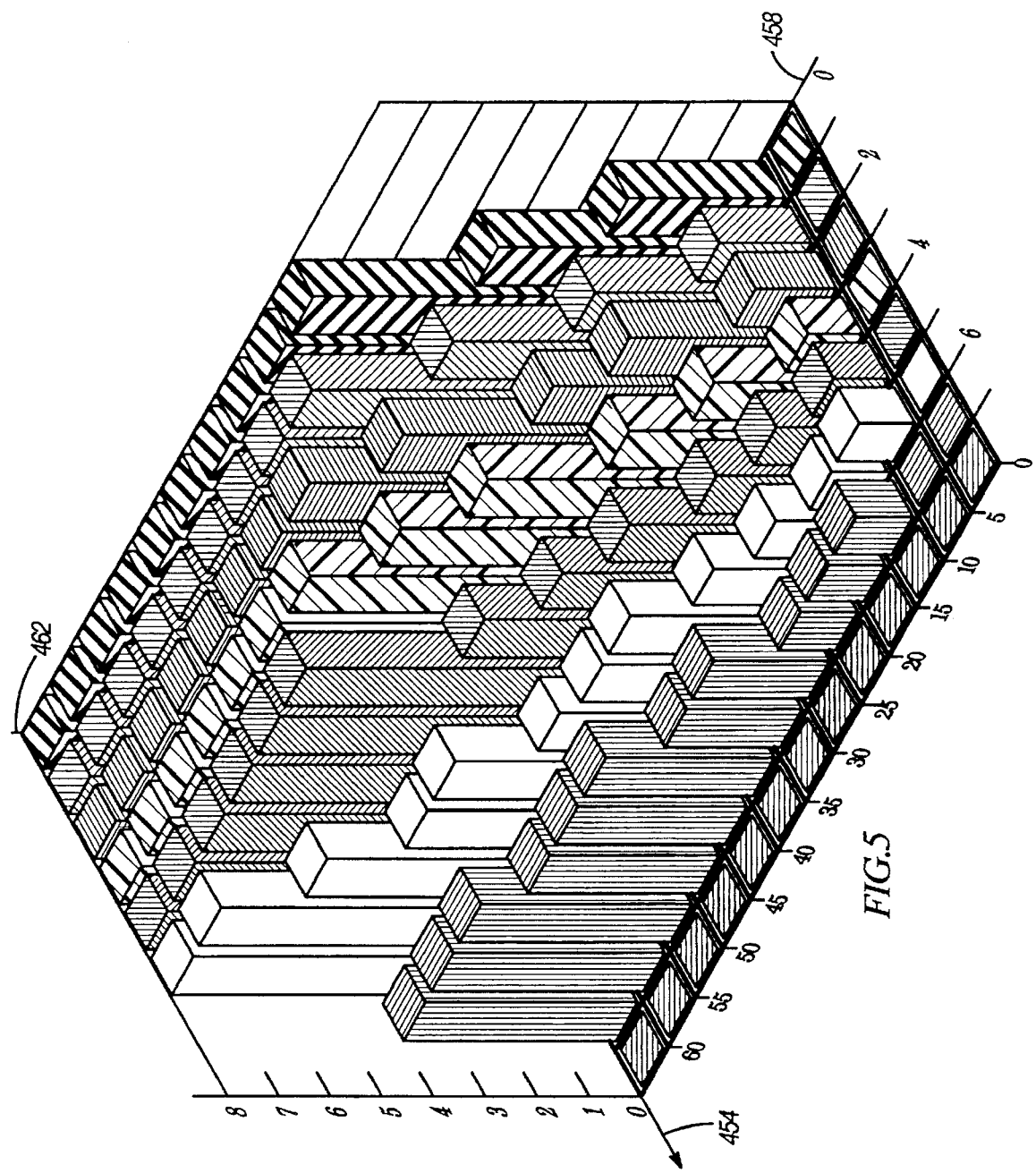
FIG. 5 is a graphical representation, taken along three axes, of the relationship between the RXLEV and RXQUAL values of signals received by a receiver and a signal transmission quality level value, SQL, formed as a function of such values.

Turning next to the graphical representation of FIG. 5, the relationship between the RXLEV and RXQUAL values which form a signal transmission quality level value SQI is represented. Axis 454 is scaled in terms of values of RXQUAL which extend between values zero and seven. Axis 458 is scaled in terms of RXLEV which have values extending between zero and sixty-three. And, axis 462 is scaled in terms of the signal transmission quality level value, SQI, in which the SQI value is scaled to be of values, according to the above equation extending between zero and eight.

Review of the resultant plot indicates that when RXLEV is of a high value, and RXQUAL is of a low value, the resultant SQI value is of a large value, with a maximum value of eight. Conversely, when the RXLEV value is of a low value, the resultant SQI value is similarly of a low value, and when the RXQUAL value is of a high value, the SQI value is again of a low value. The SQI values graphically represented in FIG. 5 are scaled such that a maximum signal transmission quality level value is of a value of eight. Other scaling factors may be utilized to produce a SQI value of a different maximum value.

Figure 6:
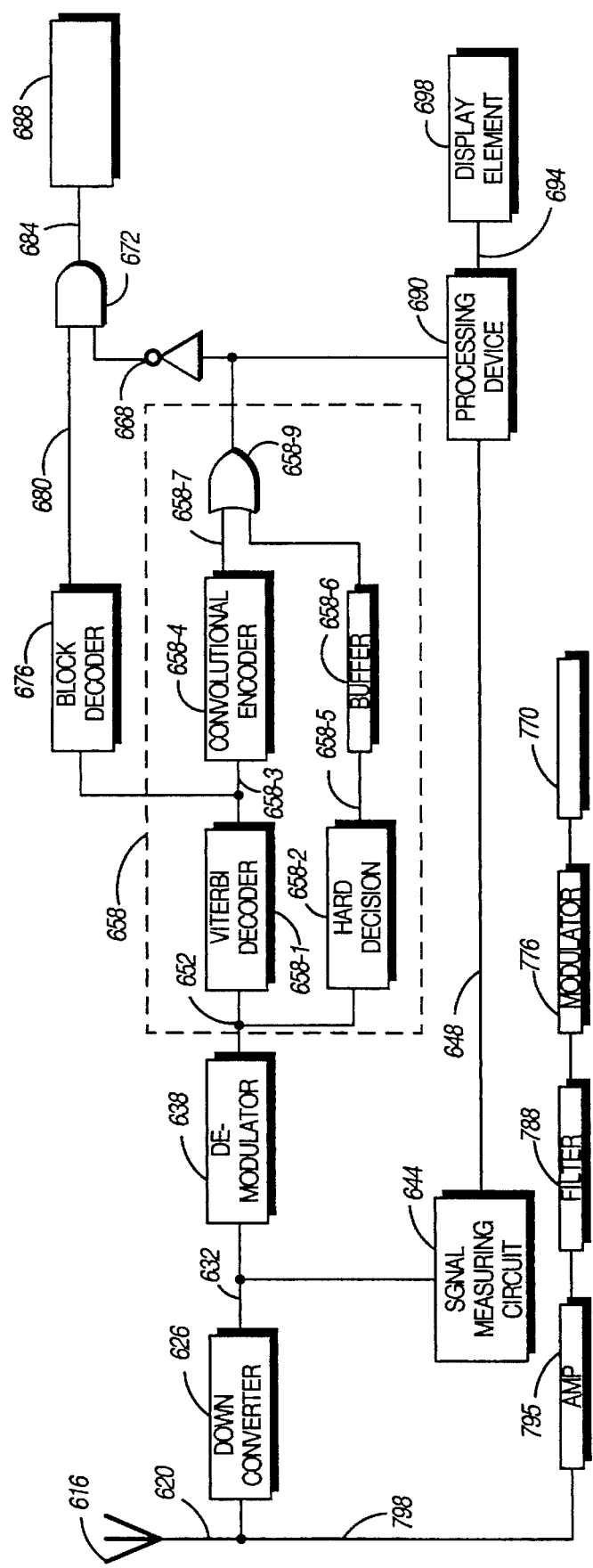
FIG. 6 is a block of a radiotelephone of a preferred embodiment of the present invention which includes the apparatus for determining signal transmission quality levels shown in FIG. 2 as a portion thereof.

Turning next to the block diagram of FIG. 6, a radiotelephone, referred to generally by reference numeral 600 of a preferred embodiment of the present invention is shown. Radiotelephone 600 includes the apparatus for determining signal transmission quality levels, similar to apparatus 100 of FIG. 2, as a portion thereof. A signal transmitted by a transmitter is detected by antenna 616 which converts the detected signal into an electrical signal on line 620. Line 620 is coupled to down converter 626 which generates a down-mixed signal on line 632.

Line 632 is coupled to demodulator 638 and signal strength measuring circuit 644. Signal strength measuring circuit 644 is operative to measure the signal strength of the signal generated on lines 632.

Signal strength measuring circuit 644 generates a signal on line 648 responsive to such measurement.

Demodulator 638 is operative to down-convert signals supplied thereto on line 632, and to generate a demodulated signal on line 652.

Line 652 is coupled to error detector 658, comprised of the elements encompassed by the block shown in hatch. Error detector 658 is operative to detect errors introduced upon the discretely-encoded information signal detected by antenna 616.

The demodulated signal generated on line 652 is supplied to Viterbi decoder 658-I and hard decision converter 658-II. Viterbi decoder 658-I generates a decoded signal on line 658-III which is supplied to convolutional encoder 658658-IV, and hard decision converter 658-II generates a hard-decision signal on line 658-V which is supplied to buffer 658-VI.

Convolutional encoder 658-IV generates an encoded signal on line 658-VII, and buffer 658-VI generates a signal on line 658-VIII; lines 658-VII and 658-VIII are each coupled to inputs of gate 658-IX. Gate 658-IX compares the values of signals applied thereto and generates an output signal on line 660 indicative of dissimilarities (i.e., bit errors) between the two signals applied to gate 658-IX.

The signal generated on line 660 is inverted by inverter 668, and then supplied to gate 672. A second input to gate 672 is a decoded signal generated by block decoder 676 on line 680. (Decoder 676 is coupled to receive, and decode, the signal generated on line 658-II.) Gate 672 generates the decoded signal supplied thereto on line 684 which is coupled to transducer 688, such as a speaker during times in which the signal generated by error detector 658 indicates that the signal does not contain an excessive number of errors.

The signal generated on line 660 is also supplied to processing device 690. Line 648 is further coupled as an input to processing device 690.

Processing device 690 is operative to weight the value of the signal strength by a value representative of the number of bit errors detected by error detector 658. For instance, the signal generated on line 648 may be of a value corresponding to the RXLEV value utilized in a GSM-cellular, communication system, and the signal supplied on line 660 may be utilized by processing device 690 to determine a RXQUAL value. In such an embodiment, processing device 690 is operative to calculate the signal transmission quality level value, SQI, defined hereinabove, and to generate a signal indicative of such calculated value on line 694 which is coupled to display element 698. Display element 698 may, for example, be similar to display element 398 of FIG. 4.

Radiotelephone 600 further includes transmitter circuitry, here shown to include transducer 770, modulator 776, filter 788, and amplifier 794. Amplifier 794 generates an amplified signal on line 798 which is coupled to antenna 616.

Because display element 698 displays a quantitative value of the actual signal transmission quality levels of a signal received by the receiver circuitry of radiotelephone 600, a user of such radiotelephone is better able to determine where a phone call may most advantageously be placed through use of such radiotelephone.

Figure 7:
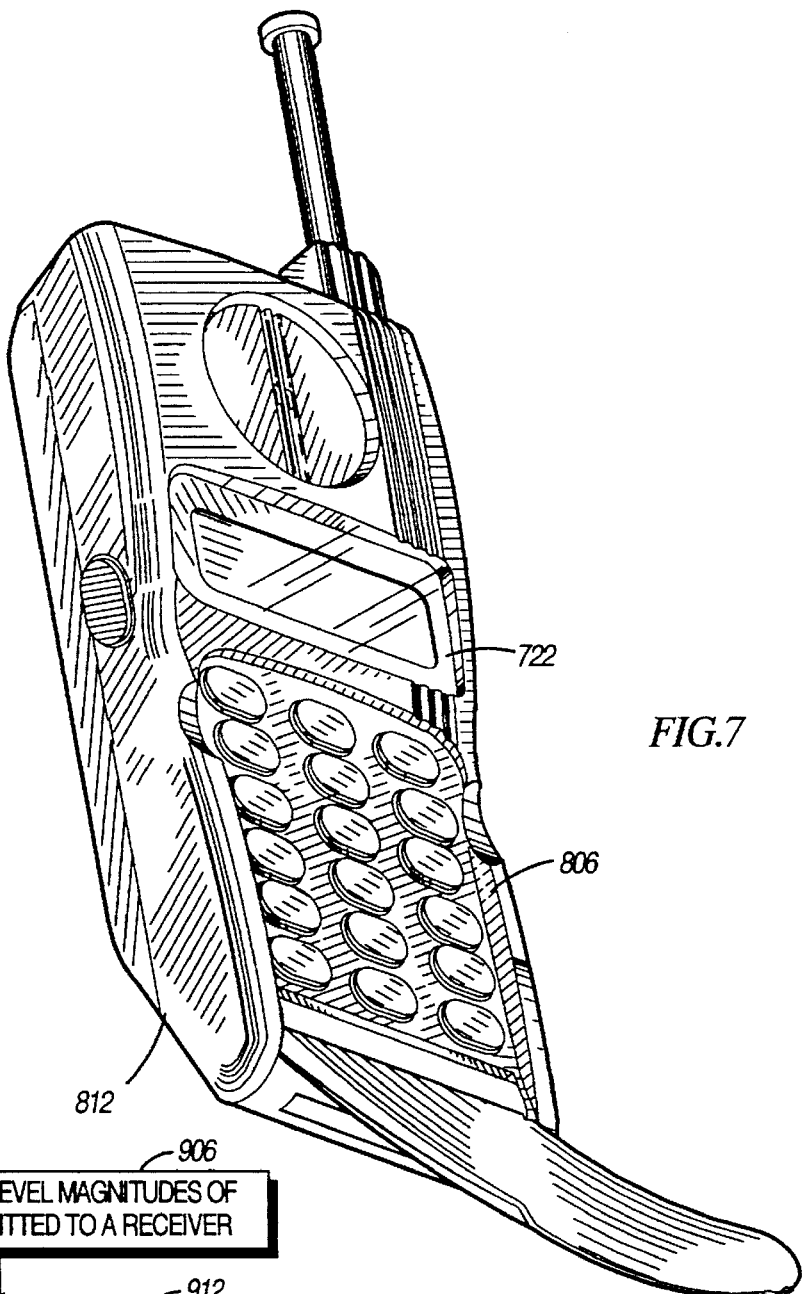
FIG. 7 is a perspective illustration of the radiotelephone shown in block form in FIG. 6.

Turning next to FIG. 7, radiotelephone 600 is shown in a perspective view. Radiotelephone 600 is shown to include housing portions 806 and 812 to which display element 722 is affixed. Other elements of radiotelephone 600 shown in block form in FIG. 6 are housed within the housing formed of the housing portions 806 and 812.

Figure 8:
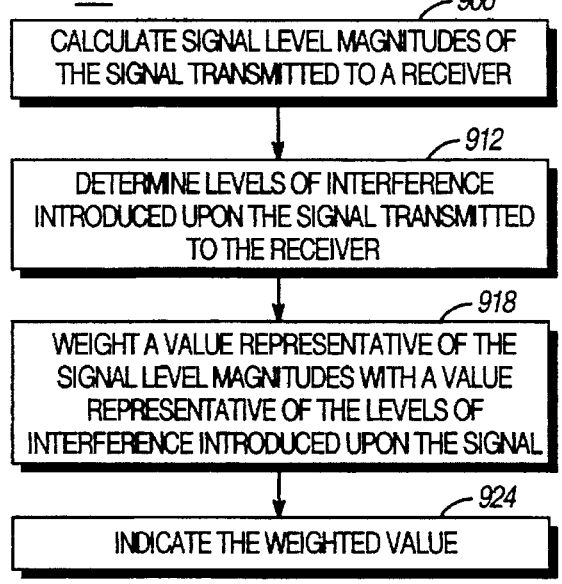
FIG. 8 is a logical flow diagram listing the method steps of the method of the preferred embodiment of the present invention for determining signal transmission quality levels of an information signal transmitted to a receiver.

Finally, turning to the logical flow diagram of FIG. 8, the method steps of the method, referred to generally by reference numeral 900, of the preferred embodiment of the present invention are shown. First, and as indicated by block 906, the signal level magnitudes of a signal transmitted to a receiver are calculated. Next, and as indicated by block 912, the levels of interference introduced upon the information signal are determined. Next, and as indicated by block 918, the received signal strength value is weighted with the interference level value. Finally, and as indicated by block 924, the weighted value is indicated.

While the present invention has been described in connection with the preferred embodiments shown in the various figures, it is to be understood that other similar embodiments may be used and modifications and additions may be made to the described embodiments for performing the same function of the present invention without deviating therefrom. Therefore, the present invention should not be limited to any single embodiment, but rather construed in breadth and scope in accordance with the recitation of the appended claims.

What is claimed is:

1. An apparatus for calculating and displaying signal transmission quality level of a wireless information bearing communications signal comprised of sequences of encoded data transmitted between a transmitter and a receiver, said apparatus comprising:

means for measuring signal level magnitudes of the signal transmitted between the transmitter and the receiver to form a received-signal strength value;

means for determining bit errors introduced upon the communications signal transmitted between the transmitter and the receiver to form an interference level value;

means, when the levels of interference indicate no bit errors, for scaling the received-signal strength value formed by said means for measuring by a scale factor to provide a signal transmission quality level value representative of quality levels of the signal transmission between the transmitter and the receiver and, when the levels of interference indicate bit errors, for mutiplying the received-signal strength value by an interference number less than one to produce a product and scaling the product by a scale factor to provide the signal transmission quality level value; and a display element having display portions operatively coupled to the means for multiplying and scaling for displaying in human perceptible form the signal transmission quality level value formed by said means for multiplying to cause various portions of the display element to turn on responsive to the signal transmission quality level value.

2. The apparatus of claim 1 wherein said received-signal strength level value formed by the means for measuring is of a value directly proportional to an amplitude of the received signal representative of the information signal transmitted between the transmitter and the receiver.

3. The apparatus of claim 1 wherein said interference level value formed by the means for determining bit error is representative of the number of bit errors of the encoded data comprising the sequences of the information signal determined after decoding of the encoded data.

4. The apparatus of claim 1 wherein the display element comprises a liquid crystal display having the display portions and wherein the signal transmission quality level value determines which portions of the display element turn on.

5. The apparatus of claim 1 wherein the interference number is determined by subtracting the interference level value from the number one.

6. The apparatus of claim 5 wherein the interference level value is scaled by another scale factor before subtracting.

7. A radio receiver operative to receive modulated signals formed of information bearing communications signals modulated upon a wireless carrier wave and transmitted thereto by a transmitter, said radio receiver comprising:

means for detecting the modulated signal transmitted by the transmitter and for generating an electrical signal indicative of the modulated signal;

means for measuring signal level magnitudes of the electrical signal indicative of the modulated signal detected by said means for detecting to form a received-signal strength value;

means for determining bit errors introduced upon the modulated signal during transmission thereto to form an interference level value;

means for, when the levels of interference indicate no bit errors, scaling the received-signal strength value formed by the means for measuring by a scale factor to provide a signal transmission quality level value representative of quality levels of signal transmission of the modulated signal transmitted by the transmitter and, when the levels of interference indicate bit errors, for mutiplying the received-signal strength value by an interference number less than one to produce a producer and scaling the product by a scale factor to provide the signal transmission quality level value; and a display element operatively coupled to the means for multiplying and scaling for displaying in human perceptible form the signal transmission quality level value formed by said means for multiplying and scaling.

8. The radio receiver of claim 7 wherein the display element comprises display portions and wherein the signal transmission quality level value determines which portions of the display element turn on.

9. The radio receiver of claim 7 wherein the interference number is determined by subtracting the interference level value from the number one.

10. The radio receiver of claim 9 wherein the interference level value is scaled by another scale factor before subtracting.

11. In a radio transceiver having transmitter circuitry and receiver circuitry, the receiver circuitry being operative to receive a wireless information bearing communications signal transmitted thereto by a remotely-positioned transmitter, a combination with the receiver circuitry of apparatus for determining transmission quality levels of the communications signal transmitted by the remotely-positioned transmitter, said apparatus comprising:

means for measuring signal level magnitudes of the signal transmitted by the remotely-positioned transmitter and the receiver circuitry to form a received-signal strength value;

means for determining bit errors introduced upon the communications signal transmitted by the remotely-positioned transmitter to the receiver circuitry to form an interference level value;

means for, when the levels of interference indicate no bit errors, scaling the received-signal strength value formed by said means for measuring by a scale factor to provide a signal transmission quality level value representative of quality levels of the signal transmission between the remotely-positioned transmitter and the receiver circuitry and, when the levels of interference indicate bit errors, for mutiplying the received-signal strength value by an interference number less than one to produce a product and scaling the product by a scale factor to provide the signal transmission quality level value; and a display element operatively coupled to the means for multiplying and scaling for displaying in human perceptible form the signal transmission quality level value formed by said means for multiplying and scaling.

12. The apparatus of claim 11 wherein the display element comprises a liquid crystal display having display portions and wherein the signal transmission quality level value determines which portions of the display element turn on.

13. The apparatus of claim 11 wherein the interference number is determined by subtracting the interference level value from the number one.

14. The apparatus of claim 13 wherein the interference level value is scaled by another scale factor before subtracting.

15. A method for determining signal transmission quality levels of a wireless information bearing communications signal comprised of sequences of encoded data transmitted between a transmitter and a receiver, said method comprising the steps of:

(a) measuring signal level magnitudes of the communications signal transmitted between the transmitter and the receiver to form a received-signal strength value;

(b) determining levels of interference introduced upon the communications signal transmitted between the transmitter and the receiver to form an interference level value;

(c) when the levels of interference indicate no bit errors, scaling the received-signal strength value formed during said step (a) of measuring by a scale factor to provide a signal transmission quality level value representative of quality levels of the signal transmission between the transmitter and the receiver;

(d) when the levels of interference indicate bit errors, mutiplying the received signal strength value by an interference number less than one to produce a product and scaling the product by a scale factor to provide the signal transmission quality level value; and (e) displaying in human perceptible form using a display element the signal transmission quality level value.

16. The method of claim 15 wherein the interference number is determined by subtracting the interference level value from the number one.

17. The method of claim 16 wherein the interference level value is scaled by another scale factor before subtracting.

* * * * *